United States Patent [19]

Ishizaki et al.

[11] Patent Number: 4,870,266

[45] Date of Patent: Sep. 26, 1989

[54] PHOTO SIGNAL STORING SENSOR DEVICE

[75] Inventors: Akira Ishizaki; Yoshio Nakamura; Shigetoshi Sugawa, all of Kanagawa, Japan

[73] Assignee: Canon Kabushiki Kaisha, Tokyo, Japan

[21] Appl. No.: 151,714

[22] Filed: Feb. 3, 1988

[30] Foreign Application Priority Data

Feb. 10, 1987 [JP] Japan ................................ 62-27267

[51] Int. Cl.$^4$ ............................................. H01J 40/14
[52] U.S. Cl. ............................... 250/214 AG; 250/578
[58] Field of Search .................... 250/208, 209, 214 R, 250/214 AG, 578, 201; 354/406, 407, 408; 358/213.19

[56] References Cited

U.S. PATENT DOCUMENTS 4,429,967  2/1984  Tokuda et al. .............. 250/214 AG
4,742,238  5/1988  Sato .................................... 250/578

Primary Examiner—David C. Nelms
Attorney, Agent, or Firm—Robin, Blecker & Daley

[57] ABSTRACT

A sensor device for cumulatively storing incident light in the form of electric charge is arranged to monitor the level of the cumulatively stored electric charge; to have one mode in which the storing action is allowed to continue until the electric charge level reaches a first, high given level if the electric charge level reaches a preset level within a given period of time; to have another mode in which the storing action is allowed to continue until the electric charge level reaches the preset level if the electric charge fails to reach the preset level within the given period of time; and to cause a signal obtained by the storing action to be read out after the end of the storing action with a degree of gain which is variable according to the mode in which the storing action is performed.

14 Claims, 8 Drawing Sheets

PHOTO SIGNAL STORING SENSOR DEVICE

BACKGROUND OF THE INVENTION

1. Field of the Invention

This invention relates to an improvement on device which is arranged to control the cumulative storing time of a photo-electric converting element and to process a cumulative signal thereof and is used for the passive type focus detecting device of a camera or the like.

2. Description of the Related Art

An example of the devices of the above stated kind is disclosed in Japanese Laid-Open Patent Application No. SHO 61-167916. In this case, in addition to a CCD sensor consisting of a plurality of picture elements (hereinafter referred to as bits), a monitor sensor is arranged, near to the CCD sensor, to monitor a mean value of brightness of an image, i.e. an average luminance value of an incident light, for the purpose of obtaining an image signal at an adequate level from the CCD sensor. According to the patent application, a signal cumulative storing action must be terminated when an integrated value obtained from the photo current of the monitor sensor reaches a preset level. The application thus has disclosed an arrangement necessary for attaining this purpose. The light receiving area of the above stated monitor sensor, however, is arranged to be in an oblong shape of a length which is, for example, 65% of the line length of the CCD sensor. Therefore, an integrated output obtainable from the same incident light having an unvarying peak luminance value varies according to whether the light is incident on the whole light receiving area of the monitor or only on a part thereof. Despite of the arrangement to terminate the signal storing action without fail at the point of time when the integrated value of the photo current of the monitor sensor reaches the preset value, the output of the monitor sensor fluctuates with the incident light receiving area on the monitor sensor. As a result, the signal cumulative storing action tends to become inaccurate in relation to an incident light luminance pattern. Further, the level of the signal cumulatively stored does not always remain within the dynamic range of an A/D converter which is disposed at the CCD sensor or on the output side thereof. In other words, the signal cumulation might become impossible in precise correlation with the luminance pattern of the incident light if the peak luminance value comes to exceed the dynamic range of the A/D converter. Further, in cases where a signal cumulatively stored at a very low luminance condition of the incident light is used in detecting the focused state of a camera, the accuracy of the result of focus detection is much lower than the result of focus detection made with a signal cumulatively stored under a high luminance condition of the incident light. However, no effective solution of this problem has been employed.

SUMMARY OF THE INVENTION

One aspect of the present invention is to provide a sensor device of the kind integrally and cumulatively storing incident light wherein there are provided a first mode in which the cumulated level of a photo signal obtained by the sensor is monitored and the cumulative storing action of the sensor on the photo signal is terminated when the level of a signal produced from a monitor reaches a high, first level within a given period of time, a second mode in which the photo signal cumulatively storing action of the sensor is terminated when the monitor signal reaches the first lever after the monitor signal reaches a second level which is lower than the first level within the given period of time and a third mode in which the photo signal cumulative storing action of the sensor is terminated when the monitor signal reaches the second level if the monitor signal fails to reach the second level within the given period of time; and the gain of reading a signal cumulated after the end of photo signal cumulation in the third mode is arranged to be different from that of reading the signal cumulated in the first or second mode.

Another aspect of the invention is to provide a sensor device which comprises first comparison means arranged to compare the peak value of a cumulatively stored signal with a first voltage and to invert the output thereof when the peak value becomes higher than the first voltage; second comparison means arranged to compare the peak value with a second voltage and to invert the output thereof when the peak value becomes higher than the second voltage; storing action terminating instruction means arranged to terminate the cumulative storing action of a photo-electric converting means when the output of the first comparison means is inverted if the output of the first comparison means is inverted before detection of the end of a given period of time by given-time detecting means, to terminate the cumulative storing action when the output of the first comparison means is inverted if the output of the second comparison means is inverted after detection of the given period of time and to terminate the storing action when the output of the second comparison means is inverted if the output of the second comparison means is not inverted after detection of the end of the given period of time; first amplifying means for amplifying a cumulatively stored signal coming from the photo-electric converting element after termination of the storing action up to a level value close to the saturation voltage of circuits arranged subsequently thereto; second amplifying means arranged to have a higher amplifying rate than the first amplifying means and to amplify the cumulatively stored signal coming from the photo-electric converting element up to the level value close to the saturation voltage of circuits disposed subsequently thereto; and gain selection means arranged to memorize whether the output of the second comparison means is inverted or not when the end of the given period of time is detected, to select the first amplifying means if the output is not inverted and to select the second amplifying means if the output is inverted. The sensor device is thus arranged to use a second voltage which is lower than a first voltage as a threshold value for determining termination of the cumulative storing action in the event of a low luminance value; to use the first voltage in the case of other degrees of luminance; and to amplify a signal cumulatively stored under a low luminance value condition up to a peak value which is nearly the same as that of a signal cumulatively stored under other luminance value conditions.

Other aspects and features of this invention will become apparent from the following detailed description of embodiments thereof taken in connection with the accompanying drawings.

DETAILED DESCRIPTION OF THE PREFERRED EMBODIMENTS

Figure 1:
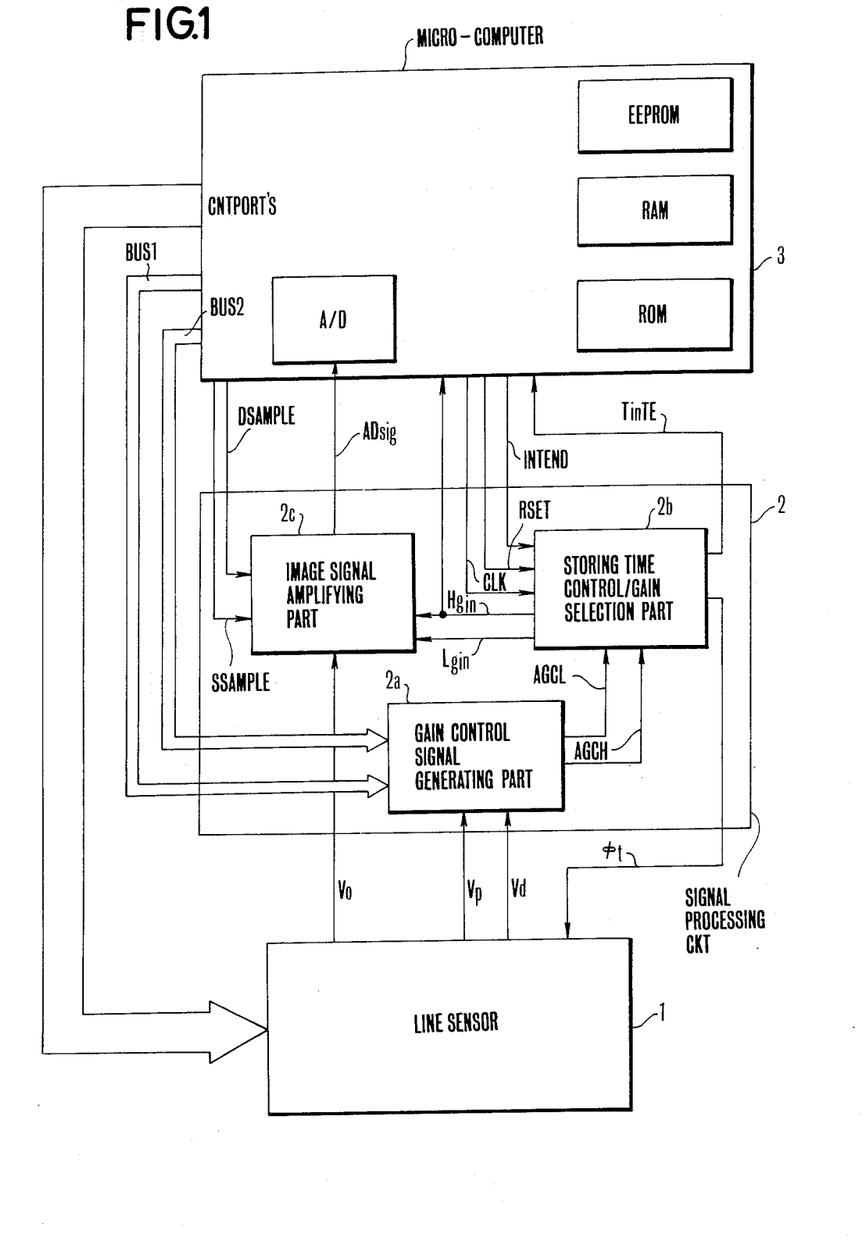
FIG. 1 is a block diagram showing in outline the arrangement of an embodiment of this invention.
Figure 2:
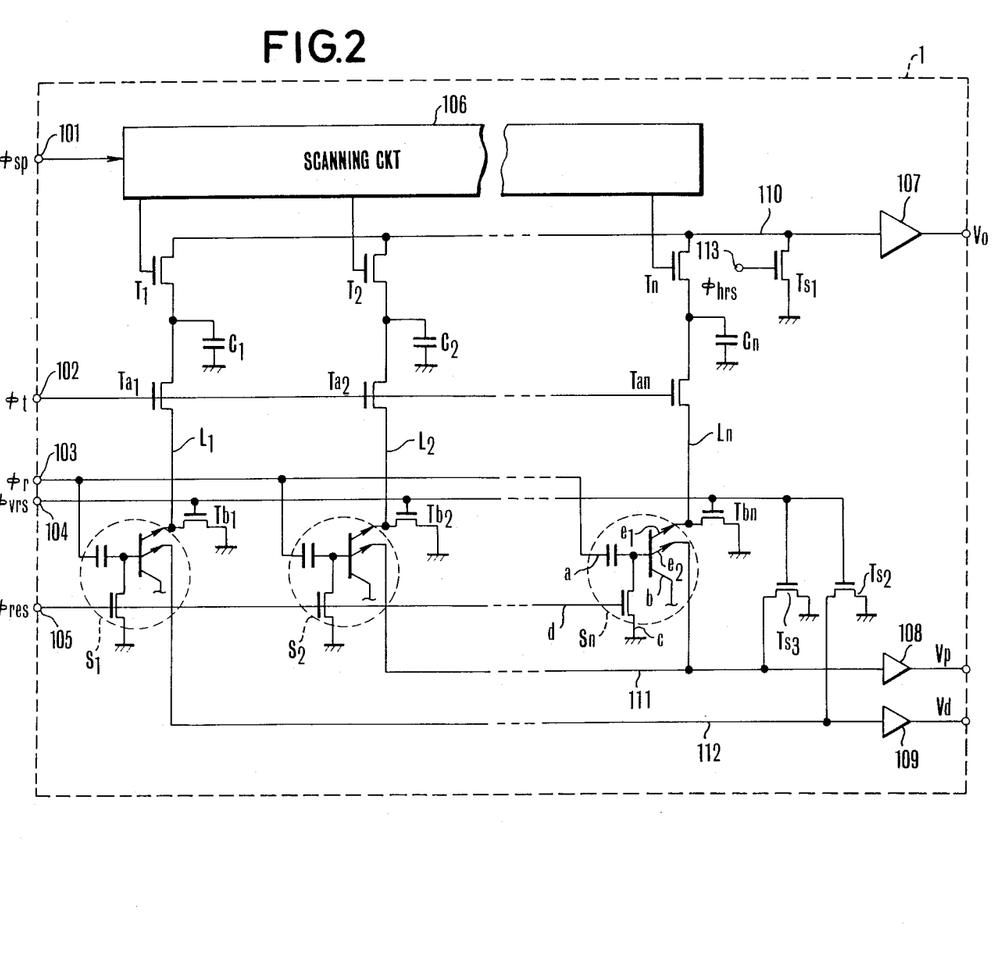
FIG. 2 is a circuit diagram showing by way of example the arrangement of a line sensor included in FIG. 1.

FIG. 1 shows in a block diagram an embodiment of this invention. A line sensor 1 consists of a plurality of bits. The line sensor 1 is arranged to produce, in addition to an image signal Vo (cumulatively stored electric charge), a peak signal Vp and a dark signal Vd relative to the image signal Vo. The details of the line sensor 1 are as shown in FIG. 2.

A signal processing circuit 2 includes a gain control signal generating part 2a which is arranged to compute and obtain a peak detection signal Vi from the peak signal Vp and the dark signal Vd produced from the above stated line sensor 1 by removing a noise component resulting from the dark signal Vd and to generate gain control signals AGCL and AGCH for controlling a cumulative storing period of time using the peak detection signal Vi and reference voltages V1 and V2 determined on the basis of buses BUS1 and BUS2 coming from a micro-computer 3; storing time control/gain selection part 2b which are arranged to control a time for terminating a cumulative storing action, to make gain selection and to generate a signal $\phi t$, a storing action end signal TinTE and gain selection signals Hgin and Lgin on the basis of the above stated gain control signals AGCL and AGCH and a reset signal RSET, a clock signal CLK and a storing action compulsorily ending signal INTEND which are sent from the micro-computer 3; and an image signal amplifying part 2c which is arranged to amplify the image signal Vo read out by the line sensor 1 on the basis of sample signals DSAMPLE and SSAMPLE which are sent from the micro-computer 3 and the above stated gain selection signals Hgin and Lgin. The details of these parts 2a, 2b and 2c are as described later herein.

The micro-computer 3 which is a one-chip micro-computer is arranged to control the line sensor 1, the signal processing circuit 2, etc. The micro-computer 3 includes therein an EEPROM which is arranged to store the contents of buses BUS1 and BUS2 provided for transmission to the above stated gain control signal generating part 2a; a RAM which is arranged not only to store the image signal read out, a maximum storing time MAXINT and a given value DARK indicating the position of a bit shielded from light but also to serve as a counter INTCNT which counts the cumulative storing time in ms and another counter bitCNT which counts the value of bit at which reading of a dark signal or an image signal at the line sensor 1 comes to an end; an A/D converting part which is arranged to convert an image signal of an analog value coming from the image signal amplifying part 2c into an image signal of a digital value; and a ROM which has an "image signal input" routine written therein as will be further described later herein.

The brief description of the operation of the whole arrangement shown in FIG. 1 is as follows: When various signals are supplied from the micro-computer 3 to the line sensor 1 indicating start of a cumulative storing action on the image signal, the line sensor 1 performs an image signal cumulative storing action by performing photo-electric converting action on the incident light and by cumulating an image signal thus obtained in the form of an electric charge. Then, the peak signal Vp and the dark signal Vd of the image signal are computed and obtained. These signals are supplied to the signal processing circuit 2. The circuit 2 determines a storing action ending time $\phi t$ for terminating the storing action of the line sensor 1 on the basis of various signals (BUS1 and BUS2) received from the micro-computer 3. Upon the lapse of the time, the signal processing circuit 2 causes the line sensor 1 to terminate its storing action and informs the micro-computer 3 of this by a signal TinTE and then determines the amplifying rate Hgin or Lgin for the image signal Vo which is received after the signal TinTE is supplied to the micro-computer 3.

Next, the micro-computer 3 supplies the line sensor 1, for each bit one after another, with a signal instructing the line sensor 1 to send out a stored signal, i.e. the image signal read. In response to this, the line sensor 1 supplies stored signals one after another as the image signal Vo to the signal processing circuit 2. The signal processing circuit 2 temporarily keeps the image signal Vo received in accordance with the instructions DSAMPLE and SSAMPLE from the micro-computer 3 an amplifies the image signal Vo for every bit at the above stated amplification rate. Through this process, the circuit 2 thus obtains an image signal ADsig of analog values and serially sends it out to the A/D converting part of the micro-computer 3. The micro-computer 3 then stores the signal within the RAM.

The image signal for all the bits is thus supplied to the micro-computer 3. In case that the above stated circuits are disposed at a passive type automatic focus detecting device of a camera, the micro-computer 3 computes a focused state obtained then on the basis of the image signal stored within the RAM. The result of computation is supplied from the micro-computer 3 to a photo taking lens driving circuit which is not shown. After that, the same processes mentioned in the foregoing are repeated.

Figure 4:
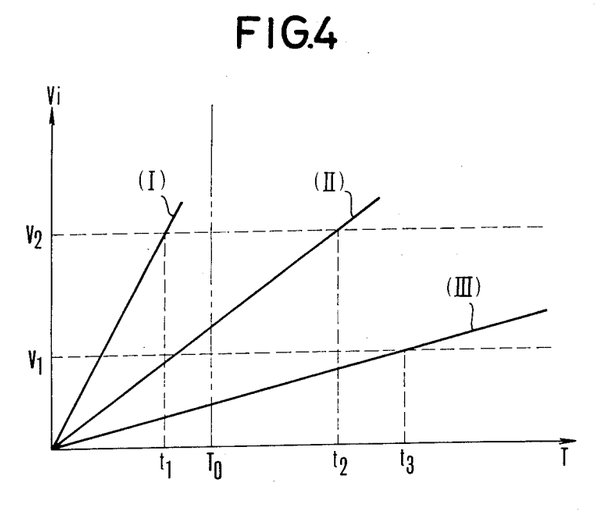
FIG. 4 is a graph showing cumulative storing time control.

The details of the arrangement and operation of each of the above stated circuits will be described with reference to FIGS. 2, and 3(A) to 3(C). Before that, the essential part of this embodiment, i.e. methods for controlling the storing action terminating time and for controlling the reading action on the image signal Vo cumulatively stored are described as follows:

Referring to FIG. 4, lines (I), (II) and (III) respectively represent cases wherein the light incident on the line sensor 1 has different degrees of luminance. These different degrees of luminance are in a relation of (I) >(II) >(III). A reference symbol To denotes a given period of time after the start of the cumulative storing action.

(i). In case that a peak detection signal Vi reaches a reference voltage V2 which is preset at a value close to the dynamic range (a saturation voltage level) before the lapse of the given period of time To after the start of the storing action: The storing or cumulating action is terminated at a point of time t1 at which the peak detection signal Vi (=Vp−Vd) reaches the reference voltage V2, as in the case of the line (I), because: If not, the peak detection signal Vi would come to exceed the dynamic range of the A/D converting part and then it would be impossible to accurately read the image signal. Another purpose of this control is to ensure adequate responsivity in the case of high degree of luminance. In this case, the amplification rate for the image signal Vo for each bit is set at 1.

(ii). In case where the peak detection signal Vi reaches the reference voltage V2 after the lapse of the given period of time To from the start of the storing action, as in the case of line (II): The cumulative storing action is allowed to continue until the peak detection signal Vi reaches the reference voltage V2. The storing action is terminated at a point of time t2 at which the signal Vi reaches the voltage V2. The amplification rate of the image signal Vo for each bit is al (iii). If the peak detection signal Vi fails to reach a reference voltage V1, which is preset at such a value that would give a sufficient responsivity, etc. in the case of a low luminance, even after the lapse of the given period of time To from the start of the cumulative storing action, as in the case of the line (III): The storing action is allowed to continue until the peak detection signal Vi reaches the reference voltage V1. The storing action is terminated at a point of time t3 when the signal Vi reaches the reference voltage V1. The amplification rate of the image signal Vo for each bit is set at V2/V1, because: In this case, the peak detection signal Vi is equal to the reference voltage V1. If the image signal Vo including the peak detection signal Vi is supplied as it is (with amplification rate set at 1) for each bit to the A/D converting part, it is hardly possible to make, for example, accurate detection of a focused state. In view of this, the image. signal Vo for each bit is thus arranged to have the same peak detection signal Vi as in the above stated cases (i) and (ii), so that the embodiment gives not only adequate responsivity but also adequate accuracy under such a low luminance condition.

Further, there is a case where the end of the storing action is to be compulsorily determined apart from the above stated control over the ending time of the storing action. This is a case where a storing action compulsorily ending signal INTEND is produced from the micro-computer 3 as will be described in detail later on. Upon receipt of this signal, the storing action is forcedly terminated. Normally, this signal is used for determining a maximum storing time which is set at a value longer than (To X V2/V1).

The details of arrangement of the circuits required in carrying out the above stated control and their operations are as described below:

FIG. 2 shows by way of example the details of the circuit arrangement of the above stated line sensor 1. The sensor 1 includes a light shielded bit S1 which is encompassed by aluminum for obtaining a dark signal and open bits S2 to Sn which are arranged side by side for reading a photo signal corresponding to the luminance pattern of light incident on the line sensor 1.

The capacitor electrode a of each bit is connected in common to a terminal 103. A given positive voltage is arranged to be applied to the collector electrode b of each bit. Further, each bit has the electrode c of a reset MOS transistor grounded; its gate electrode d connected in common to a terminal 105; and an emitter electrode e1 connected to one of vertical lines L1 to Ln. The vertical lines L1 to Ln are connected via transistors Ta1 to Tan to electric charge cumulating capacitors C1 to Cn and also connected via transistors T1 to Tn to an output signal line 110. The output signal line 110 is grounded via a reset transistor Ts1 and is connected to an amplifier 107. The gate electrodes of the transistors T1 to Tn are connected to the parallel output terminals of a scanning circuit 106 which is arranged to receive via a terminal 101 a shift pulse signal φsp. The transistors T1 to Tn are thus arranged to turn on one after another according to the action of the scanning circuit 106.

The vertical lines L1 to Ln are grounded via transistors Tb1 to Tbn. The gate electrodes of these transistors Tb1 to Tbn are connected in common to a terminal 104. The emitter electrode e2 of the light shielded bit S1 is connected to a line 112 via a transistor Ts2. The line 112 is grounded via a transistor Ts2 and is connected to an amplifier 109. The emitter electrodes e2 of the open bits S2 to Sn are connected to a line 111. The line 111 is grounded via a transistor Ts3 and is connected to an amplifier 108. The gate electrodes of the transistors Ts2 and Ts3 are connected also to the terminal 104.

With the line sensor 1 arranged in this manner, when a signal φres is applied from the micro-computer 3 to the terminal 105, the reset MOS transistors of all the bits turn on. Then, the electric charge accumulated in the p base areas of all the bits is removed to allow them to have a given potential. Following this, when a signal φvrs is applied to the terminal 104, the transistors Tb1 to Tbn, Ts2 and Ts3 turn on to ground all the emitter electrodes e1 and e2. Further, when a pulse signal φr for initialization is applied to the terminal 103, the charge accumulated in the p base area is removed as stated above.

Under this condition, when the signal φres ceases to be applied to the terminal 105 to have a storing action begin to cumulate a photo signal, the reset MOS transistors turn off. Then, a photo-electric converting action first begins according to the quantity of light incident upon the bits S2 to Sn. Meanwhile, a dark signal is produced at the light shielded bit S1. Following this, when the signal φvrs is stopped from being applied to the terminal 104 for the purpose of causing the charge resulting from the above stated action to be cumulated at capacitors C1 to Cn, the transistors TB1 to Tbn, Ts2 and Ts3 turn off. This brings the emitter electrodes e1 and e2 of the bits into a floating state. Following that, a signal φt is applied from the micro-computer 3 to the terminal 102 via the signal processing circuit 2. This turns on the transistors Ta1 to Tan. After that, when a pulse signal φr for reading is applied to the terminal 103, the dark signal is read out via the vertical line L1 from the light shielded bit S1 to be cumulated at the capacitor C1 while a signal corresponding to the incident light quantity is read out via the vertical lines L2 to Ln from the open bits S2 to Sn to be cumulated at capacitors C2 to Cn respectively.

After that, when a low level signal φt indicative of the end of the cumulative storing action is applied from the signal processing circuit 2 to the terminal 102 (as will be described in detail later on), the transistors Ta1 to Tan turn off to bring the cumulative storing actions of the capacitors C1 and C2 to Cn to an end. When shift pulses φsp are applied to the terminal 101 one after another, the scanning circuit 106 causes the transistors T1 to Tn to turn on one after another, because the scanning circuit 106 is arranged to turn on each of these transistors T1 to Tn in regular sequence beginning with the transistor T1 every time one of the shift pulses φsp is applied. Then the electric charge of the capacitors C1 to Cn corresponding to the transistors T1 to Tn turned on is serially sent out as the image signal Vo via the output signal line 110 and the amplifier 107 to the signal processing circuit 2. Further, when a signal φhrs is applied from the micro-computer 3 to a terminal 113 immediately after that, the transistor Ts1 is turned on by this to have residual electric charge removed from the output signal line 110.

Further, a detecting action for detecting the peak signal Vp and the dark signal Vd is performed in parallel with the above stated storing action. More specifically, when the signal φr is applied to the terminal 103 during the above stated operation, the dark signal is read out from the light shielded bit S1 to the line 112. Then, the signal is produced via the amplifier 109 as the dark signal Vd. Meanwhile, the signal from the open bits S2 to Sn is read out to the line 111 and is produced as a peak signal Vp through an amplifier 108. In other words, since the line 111 is connected in common to these bits as mentioned in the foregoing, the peak of the signals from the open bits S2 to Sn appears as a peak signal on the output side of the amplifier 108, so that it can be produced as the peak signal Vp from the amplifier 108.

Figure 3A:
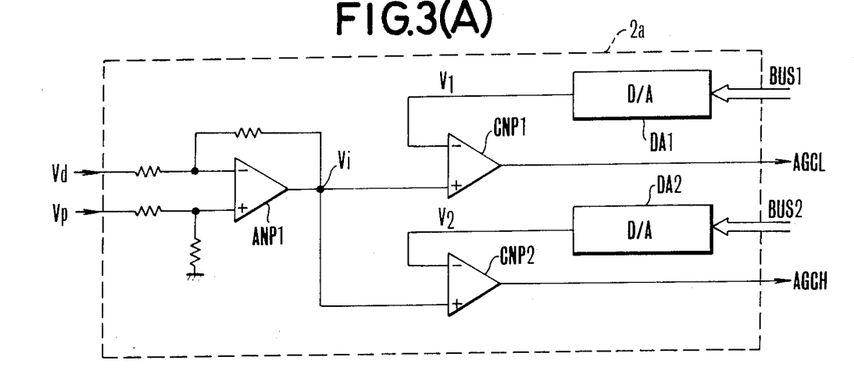
FIGS. 3(A), 3(B) and 3(C) are circuit diagrams showing by way of example the arrangement of various parts of a signal processing circuit included in FIG. 1.

FIG. 3(A) shows an example of arrangement of the above stated gain control signal generating part 2a. As mentioned in the foregoing, this part 2a forms gain control signals AGCL and AGCH which are to be used in controlling the cumulative storing time. The above stated dark signal Vd and the peak signal Vp are supplied to an amplifier ANP1. The amplifier ANP1 performs a computing operation (Vp−Vd) for obtaining a peak detection signal Vi which is free from any noise component due to the dark signal Vd. The peak detection signal Vi is supplied to the non-inverting input terminals of comparators CNP1 and CNP2. Meanwhile, the buses BUS1 and BUS2 which are digital signals produced from the micro-computer 3 are supplied to D/A converters DA1 and DA2 to be converted into reference voltages V1 and V2 (V1<V2) which are analog signals defining threshold levels for the peak detection signal Vi. The reference voltages V1 and V2 are supplied to the inverting input terminals of the above stated comparators CNP1 and CNP2. The comparators CNP1 and CNP2 compare these signals and generate the gain control signals AGCL and AGCH as a result of the comparison. The above stated buses BUS1 and BUS2 are adjusted during the process of assembly work and is stored within the EEPROM of the micro-computer 3. The contents of the EEPROM, i.e. the reference voltages V1 and V2, are arranged as follows: The reference voltage V1 is preset at a value which is close to the dynamic range of the A/D converting part of the micro-computer 3. In other words, it is set at a maximum value allowable for increasing the resolution. The reference voltage V2 is preset at an appropriate value with respect to responsivity obtainable in the event of low luminance and the adverse effect of the variations of the dark signal on the image signal, because the dark signal tends to fluctuate according as the cumulative storing time becomes longer.

Figure 3B:
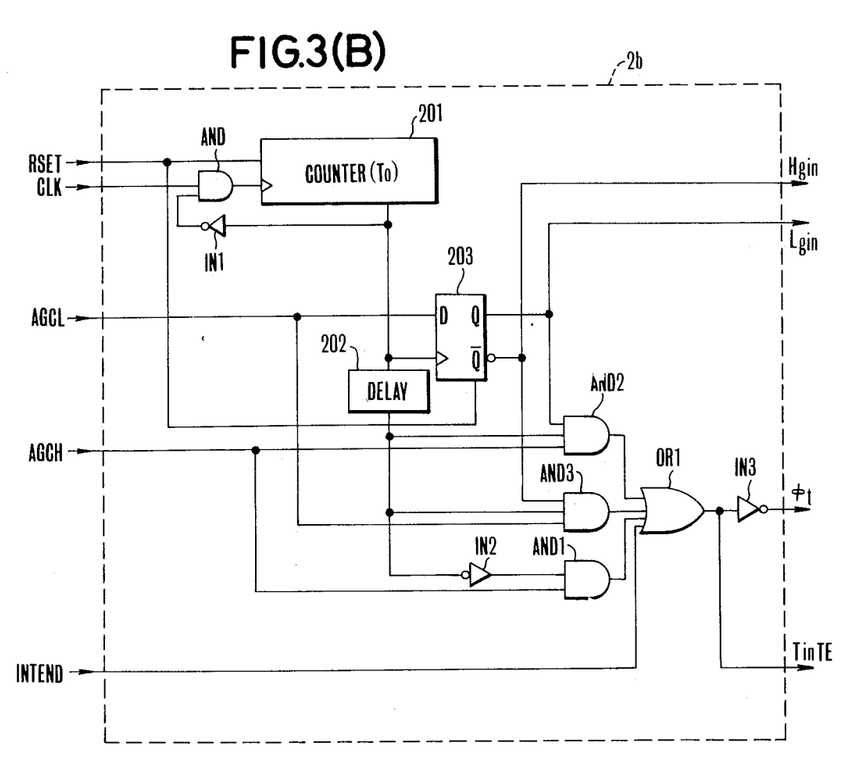

FIG. 3(B) shows an example of the storing time control/gain selection part 2b, which is arranged to control the cumulative storing action terminating time and selects the degree of gain of the image signal Vo as mentioned in the foregoing. A counter 201 is arranged to count the pulses of a clock signal CLK which comes through an AND gate AND at the same time as commencement of the storing action and to produce a signal at a high level (hereinafter referred to as H level) when the counted time reaches a given length of time To. Then, an inverter IN1 comes to produce a signal at a low level (hereinafter referred to as L level) to cause the clock signal CLK to stop coming to the counter 201. Each of AND gates AND1, AND2 and AND3 is arranged to receive the above stated H level signal at one of its input terminals via a delay line 202 or an inverter IN2. The other input terminal of each of the AND gates AND1 to AND3 is arranged to receive from the above stated gain control signal generating part 2a the gain control signal AGCL or AGCH. Therefore, in the cases (I), (II) and (III) of FIG. 4 mentioned in the foregoing, the circuit arrangement of this part 2b operates as follows:

In the case of (I): Before the lapse of the given time To after commencement of the storing action, the output of the inverter IN2 is at an H level. If the peak detection signal Vi then reaches the reference voltage V2, the level of the gain control signal AGCH becomes an H level. This causes the output level of the AND gate AND1 to become high. With the output level of the AND gate AND1 changed to an H level (at the point of time t1 of FIG. 4), the level of the signal φt is caused to change from an H level to an L level via an OR gate OR1 and an inverter IN3 and the H level signal φt is supplied to the line sensor 1. Then, as mentioned in the foregoing, the transistors Ta1 to Tan turn off to terminate the storing action. Further, since the gain control signal AGCL is then at an H level, the Q output of a D flip-flop 203 is at an H level. Therefore, as for a gain selection signal for determining the rate of amplification, the gain selection signal Lgin which is indicative of an amplifying rate of 1 is selected and is produced as will be further described later.

In the case of (II): The output of the circuit is at an H level after the lapse of the given time To from the commencement of the storing action. The gain control signal AGCL is then at an H level. Therefore, the Q output of the D flip-flop 203 is at an H level. When the peak detection signal Vi then reaches the reference voltage V2, another gain control signal AGCH becomes an H level. In that instance, the output level of the AND gate AND2 becomes an H level. When the output level of the AND gate AND2 changes to the H level (at the point of time t2 of FIG. 4), the signal φt changes from an H level to an L level through the OR gate OR1 and an inverter IN3 and is supplied to the line sensor 1. The storing action thus comes to an end. As regards the gain selection signal for determining the amplifying rate, the gain selection signal Lgin is selected and produced, because the Q output of the D flip-flop 203 is at an H level as mentioned above.

In the case of (III): The output of the circuit is at an H level after the lapse of the given time To from the commencement of the storing action. The gain control signal AGCL is then at an L level. Therefore, the $\overline{Q}$ output of the D flip-flop 203 is at an H level. When the peak detection signal Vi then reaches the reference voltage V1, the level of the gain control signal AGCL becomes an H level. In this case, the output level of the AND gate AND3 becomes an H level. When the output level of the AND gate AND3 changes to the H level, at the point of time t3 of FIG. 4, the signal φt is supplied to the line sensor 1 with its level changed from an H level to an L level through the OR gate OR1 and the inverter IN3. The cumulative storing action comes to an end. As for the gain selection signal for determining the rate of amplification, a gain selection signal Hgin which is indicative of an amplifying rate of V2/V1 is selected and produced in a manner as will be described in detail later, because the $\overline{Q}$ output of the D flip-flop is at the H level as mentioned above.

In case that the storing action compulsorily ending signal INTEND mentioned in the foregoing is supplied at an H level, the signal $\phi t$ is supplied via the OR gate OR1 and the inverter IN3 to the line sensor 1 to terminate the cumulative storing action. In any of the above stated cases, an H level storing action end signal TinTE is generated and supplied to the micro-computer 3 concurrently with the generation of the signal $\phi t$.

Figure 3C:
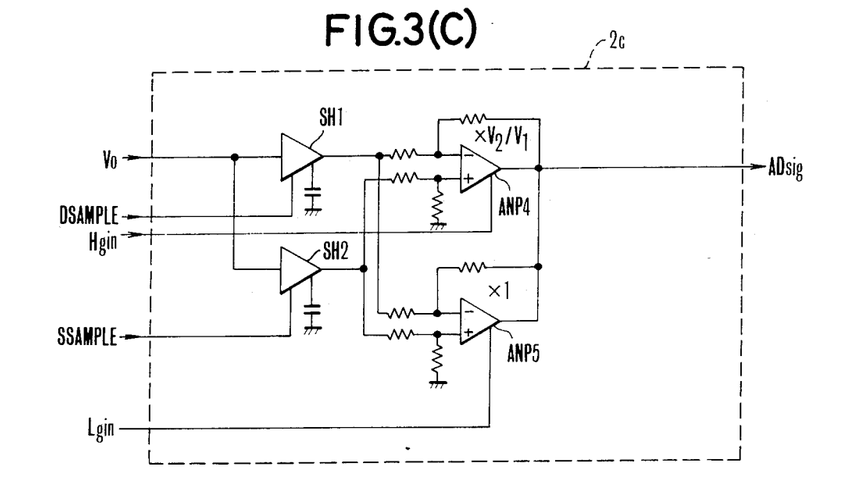

FIG. 3(C) shows an example of the arrangement of the image signal amplifying part 2c. This part 2c is arranged to amplify the image signal Vo on the basis of the gain selection signal Hgin or Lgin obtained from the above stated gain control signal generating part 2a.

When the dark signal which is produced at the light shielded bit S1 is supplied as the image signal Vo, the value of it is held at a sample-and-hold circuit SH1 as the micro-computer 3 then sends a sampling signal DSAMPLE as will be further described later. Following this, signals produced at the open bits S2 to Sn are serially sent as the image signal Vo. At that time, the micro-computer 3 sends another sampling signal SSAMPLE as will be further described later. Therefore, the value of the signal is held by a sample-and-hold circuit SH2 for every bit. The held value is appropriately amplified by amplifiers ANP4 and ANP5 at an amplifying rate according to the gain control signal AGCL or AGCH received from the above stated gain control signal generating part 2a. (Note that the amplified signal is of a value obtained with the above stated dark signal portion subtracted.) The signal thus amplified is produced as an image signal ADsig. Further, the amplifying rate of the amplifier ANP4 is set at a value which nearly coincides with V2/V1.

Figure 5:
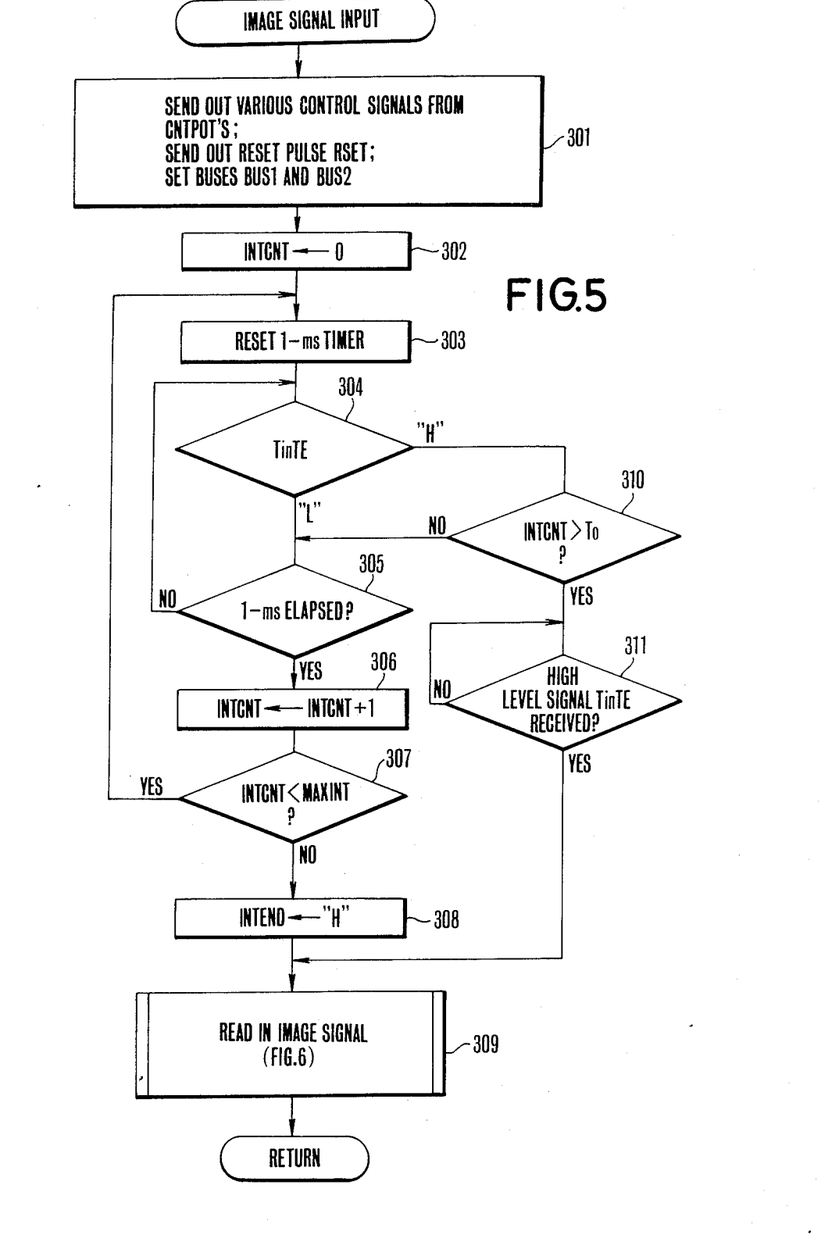
FIGS. 5 and 6 are flow charts showing the operation of a micro-computer included in FIG. 1.
Figure 6:
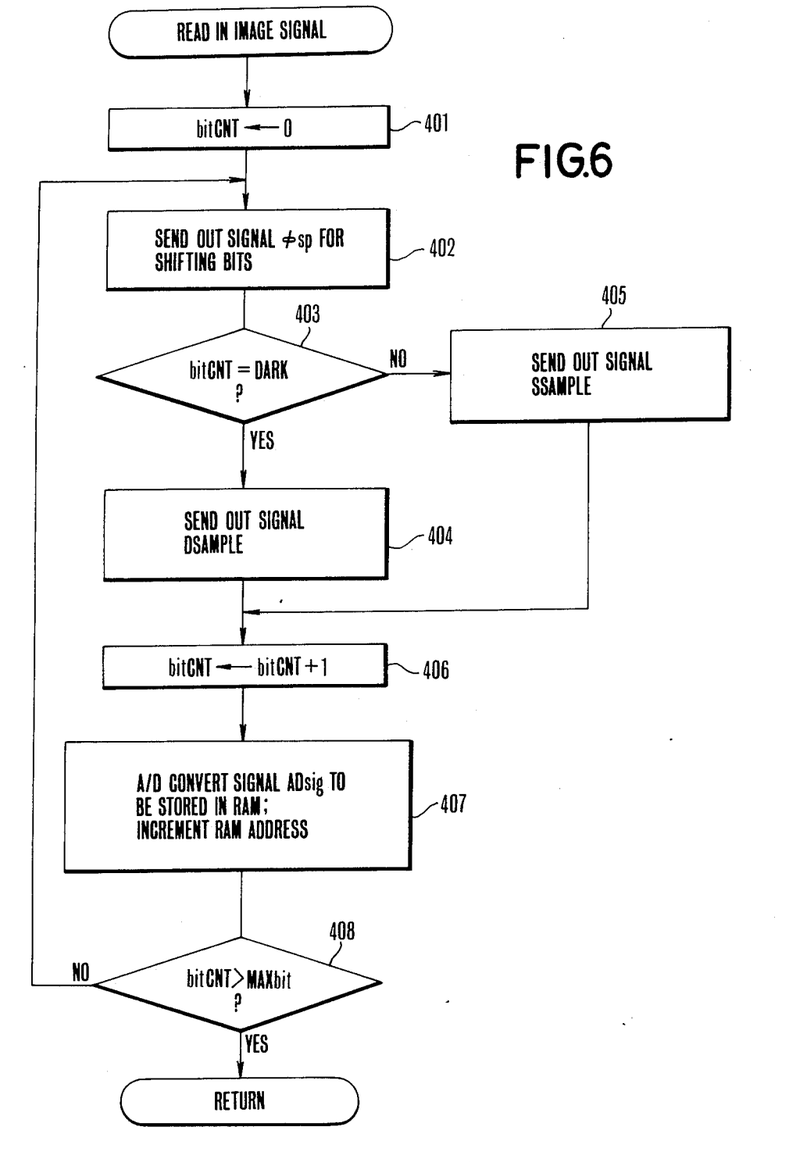

The following describes the operation of the micro-computer 3 with reference to FIGS. 5 and 6 which are flow charts: FIGS. 5 and 6 show the operation as subroutines. This indicates a high degree of universality of the cumulative storing action control part of the embodiment.

FIG. 5 shows an "image signal input" routine. With this routine called, the operation of the micro-computer 3 begins with a step 301. Step 301: To cause the line sensor 1 to begin the storing action, the various control signals $\phi r$, $\phi vrs$, $\phi res$, etc. which are as shown in FIG. 2 are supplied from an output port CNTPORT'S to the line sensor 1. At the same time, a reset pulse RSET is applied to the signal processing circuit 2. With these control signals produced, the line sensor 1 performs the storing action in the manner as described in the foregoing with reference to FIG. 2. Further, the micro-computer 3 sets the buses BUS1 and BUS2 which are to be supplied to the signal processing circuit 2.

Step 302: The content of the storing time counter INTCNT disposed on the RAM which is arranged to serve as a counter for counting the storing time in unit of 1 ms is set at "0" (INTCNT 0). Step 303: The 1 ms timer disposed on the RAM which is arranged to serve as a 1 ms timer for counting by 1 ms is reset.

Step 304: The storing action end signal TinTE which is received from the signal processing circuit 2 is checked to find whether the storing action has come to an end through the H or L level of the signal. If the signal is found to be at the H level, the operation comes to a step 310. If not, the operation comes to the step 305. Step 305: A check is made to see whether the 1 ms timer which has been reset has counted 1 ms. If not, the operation comes back to the step 304. If so, the operation proceeds to a step 306. The given time To to be counted by the counter 201 mentioned in the foregoing is set at a value, for example, between 10 ms and 20 ms. Step 306: The content of the storing time counter INTCNT is increased by one (INTCNT→INTCNT +1). Step 307: The content of the storing time counter INTCNT is compared with the maximum storing time MAXINT. If it is found less than the maximum time (INTCNT<MAXINT), the operation comes back to the step 303 to wait for the end of the storing action once again. If not (INTCNT=≧MAXINT), the operation comes to a step 308.

Step 308: Since the storing time is found to have reached the maximum storing time at the preceding step 307, the storing action compulsorily ending signal INTEND is supplied at an H level to the signal processing circuit 2 to compulsorily bring the cumulative storing action to an end. Step 309: Since the storing action has come to an end, an "image signal reading" routine is called for reading the image signal. The details of this routine will be described later with reference to FIG. 6.

In case that the storing action end signal TinTE is found to be at an H level at the step 304, the operation comes to the step 310 as mentioned above. Step 310: The storing time counter INTCNT is checked to see if the content thereof has exceeded the given time To. If so (INTCNT<To), the operation proceeds to a step 311. If not (INTCNT≦To), it comes back to the step 305 to wait until the storing time comes to exceed the given time value To. This is because the gain selection signal Lgin or Hgin which is as shown in FIG. 3(B) is determined at the time point of the given time To. Step 311: The flow of operation waits for the arrival of the storing action end signal TinTE at an H level. Upon arrival of this signal, it comes to the step 309.

Referring now to FIG. 6, the "image signal reading" routine is as follows: With this routine called at the above stated step 309, this routine is executed beginning with a step 401. Step 401: The content of the bit number counting counter bitCNT disposed on the RAM which is arranged on the RAM to count the number of bits having cumulated therein either the dark signal or the image signal at the above stated line sensor is changed to "0" (bitCNT→0). Step 402: A signal $\phi sp$ which is for shifting the bit by one is supplied to the scanning circuit 106 of the line sensor 1.

Step 403: The content of the bit number counting counter bitCNT is compared with a given value DARK which indicates the position of the light shielded bit S1 and is stored within the RAM. Since this bit is always located in the first place among others in the case of this embodiment shown in FIG. 2, the given value DARK can be expressed as DARK=0. If the two values thus compared are found to be equal to each other (bitCNT=DARK), the operation proceeds to a step 404. If not (bitCNT≠DARK), the operation comes to a step 405. In other words, the operation comes to the step 404 in the case of reading the light shielded bit S1 and to the step 405 for reading the open bits S2 to Sn.

Step 404: The sampling signal DSAMPLE is sent out to the image signal amplifying part 2c disposed within the signal processing circuit 2. This causes the potential (the dark signal) of the light shielded bit S1 to be held by the sample-and hold circuit SH1 within the image signal amplifying part 2c. Step 405: The sampling signal SSAMPLE is sent out to the image signal amplifying part 2c of the signal processing circuit 2. This causes the potentials (image signals) of the open bits S2 to Sn to be held by the sample-and-hold circuit SH2 within the image signal amplifying part 2c.

Step 406: The content of the bit number counting counter bitCNT is increased by one (bitCNT→bitCNT+1). Step 407: The image signal ADsig which is produced from the signal processing circuit 2 is A/D converted by the A/D converting part and is stored within the RAM. The RAM address is incremented accordingly.

Step 408: The content of the bit number counter bitCNT is compared with the maximum bit value MAXbit (a total number of the open bits) which is preset within the RAM. If the content of the bit number counter bitCNT does not exceed the maximum bit value MAX bit (bitCNT≦MAXbit), the operation comes back to the step 402 to repeat the reading action. If the former exceeds the latter (bitCNT>MAXbit), the operation comes back to the step 309 of FIG. 5.

In the case of this embodiment, the storing action is arranged to be terminated when the result of the storing action reaches the reference voltage V2 which is preset at a value not exceeding the dynamic range of the A/D converting part, etc. This effectively prevents the peak value of the serial image signal Vo produced from the line sensor 1 and a value around it from coming to exceed the dynamic range. Therefore, the embodiment is capable of giving an image signal which adequately corresponds to the luminance pattern of the incident light. Further, since the storing action is arranged to be terminated when the reference voltage V2 is reached as mentioned above, the integrating action can be immediately terminated in the event of a high luminance degree of the incident light (like in the case of the line (I) of FIG. 4). Therefore, the embodiment ensures a good responsivity under such a condition.

Further, in the event of a low luminance degree of the incident light (like in the case of the line (III) of FIG. 4), the integrating action is terminated when the reference voltage V1 is reached. Therefore, the embodiment not only has a good responsivity but also is capable of enlarging the readable luminance range. While it has been impossible to accomplish adequate reading under a low luminance condition because of the maximum storing time MAXINT, the use of the above stated reference voltage V1 as a threshold value advantageously increases the probability of successful reading under the same low luminance condition. Further, in case that the integrating or cumulative storing action is terminated when the reference voltage V1 is reached, the embodiment multiplies the serial image signal Vo thus obtained by V2/V1 for the purpose of making the peak value unvarying. This arrangement ensures an increase in the accuracy of the image signal.

Figure 7:
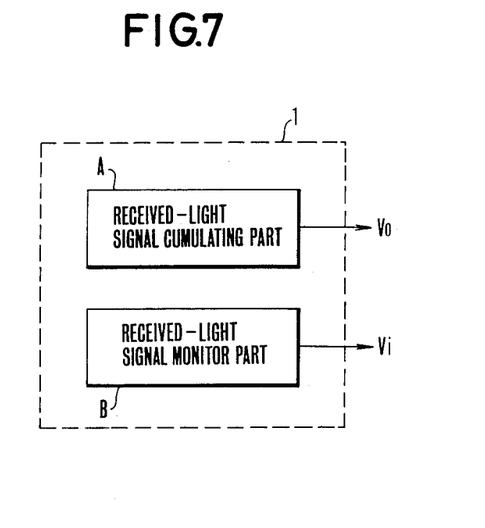
FIG. 7 is a schematic illustration of another example of a sensor to be arranged in accordance with this invention.

In the embodiment described, the sensor device which is arranged as shown in FIG. 2 is employed. However, the sensor device may be arranged as shown in FIG. 7. In that case, the sensor consists of a light receiving signal cumulating part A and a light receiving signal monitor part B. The monitor part B is arranged to produce the peak signal Vi while the cumulating part A is arranged to produce the image signal Vo.

What is claimed is:

1. A photo signal storing type sensor device for cumulatively storing a signal corresponding to incident light, comprising:
   a. first comparison means arranged to compare the level of a photo signal being cumulatively stored by said sensor device with a first level and to produce an output when the level of the cumulatively stored photo signal comes to exceed said first level;
   b. second comparison means arranged to compare the level of said cumulatively stored photo signal with a second level which is higher than said first level and to produce an output when the level of said stored photo signal comes to exceed said second level;
   c. a storing time control circuit having a first mode in which said control circuit terminates the signal storing action of said sensor device in response to the output of said second comparison means when said output is generated before the lapse of a given period of time after commencement of said signal storing action, a second mode in which said control circuit terminates said signal storing action of said sensor device in response to the output of said second comparison means when the level of said photo signal being cumulatively stored is between said first and second levels before the lapse of said given period of time after commencement of said signal storing action, and a third mode in which said storing time control circuit terminates said signal storing action in response to the output of said first comparison means when no output is generated by said first comparison means within said given period of time after commencement of said signal storing action;
   d. a reading circuit which reads out the stored signal after termination of said signal storing action of said sensor device, said reading circuit including an amplification circuit which is arranged to amplify said stored signal; and
   e. a gain adjustment circuit which is arranged to adjust the gain of said amplification circuit to a first value of gain when said storing time control circuit is in said first and second modes and to a second value of gain when said control circuit is in said third mode.

2. A device according to claim 1, wherein said storing time control circuit includes a timer which is arranged to begin to count time from the start of said storing action and to produce an output after the lapse of said given period of time; a first enabling circuit which is arranged to make a check for the output of said first comparison means at a point of time when the output of said timer is generated and to enable said storing action to be terminated by the output of said second comparison means if the output is found to be produced from said first comparison means at said point of time; a second enabling circuit which is arranged to enable said storing action to be terminated by the output of said first comparison means if no output of said first comparison means is found at said point of time; and a third enabling circuit which is arranged to enable said storing action to be terminated by the output of said second comparison means when said output is generated before generation of the output of said timer.

3. A device according to claim 2, wherein said storing time control circuit further includes a storage circuit arranged to store the output of said first comparison means in synchronism with the output of said timer, to be in a first storing state if said first comparison means produces an output when the output of said timer is generated and to be in a second storing state if said first comparison means produces no output when the output of said timer is generated; said first enabling circuit is arranged to become operative in response to said first storing state of said storage circuit; said second enabling circuit is arranged to become operative in response to said second storing state of said storage circuit; and said third enabling circuit is arranged to shift from an enabling state to an inhibiting state in response to the output of said timer.

4. A device according to claim 3, wherein said storage circuit is connected to said gain adjustment circuit; and said gain adjustment circuit is arranged to adjust said gain to the first degree of gain in response to the first storing state of said storage circuit and to the second degree of gain in response to the second storing state of said storage circuit.

5. A device according to claim 1, wherein the first degree of gain which is to be determined by said gain adjustment circuit is set at a value N and the second degree of gain at a value N x a second level/a first level.

6. A device according to claim 1, further comprising a plurality of light receiving parts and a plurality of storing parts each of which is arranged to cumulatively store a photo signal corresponding to incident light received at corresponding one of said light receiving parts, wherein said first and second comparison means are arranged to compare the largest value of said stored photo signal with said first and second levels.

7. A device according to claim 1, further comprising first and second light receiving parts, wherein a signal indicative of the cumulatively stored photo signal corresponding to light incident on said first light receiving part is compared by said first and second comparison means, and wherein a photo signal cumulatively stored according to light incident on said second light receiving part is read out by said reading circuit.

8. A device according to claim 1, wherein said amplification circuit includes a first amplification circuit which has said first degree of gain and a second amplification circuit which has said second degree of gain; and said gain adjustment circuit is arranged to select said first amplification circuit when said mode is either the first mode or the second mode and said second amplification circuit in the event of said third mode.

9. A photo signal storing type sensor device for cumulatively storing a signal corresponding to incident light, comprising:
  a. first comparison means arranged to compare the level of a photo signal being cumulatively stored by said sensor device with a first level and to produce an output when the level of the cumulatively stored photo signal comes to exceed said first level;
  b. second comparison means arranged to compare the level of said cumulatively stored photo signal with a second level which is higher than said first level and to produce an output when the level of said stored photo signal comes to exceed said second level;
  c. a storing time control circuit having a first mode in which said control circuit terminates the signal storing action of said sensor device in response to the output of said second comparison means when said output is generated before the lapse of a given period of time after commencement of said signal storing action, a second mode in which said control circuit terminates said signal storing action of said sensor device in response to the output of said second comparison means when the level of said photo signal being cumulatively stored is between said first and second levels before the lapse of said given period of time after commencement of said signal storing action, and a third mode in which said storing time control circuit terminates said signal storing action in response to the output of said first comparison means when no output is generated by said first comparison means within said given period of time after commencement of said signal storing action;
  d. a reading circuit which reads out the cumulatively stored signal after termination of said signal storing action of said sensor device, said reading circuit including a first signal line which is arranged to have said signal read out with a first degree of gain and a second signal line which is arranged to have said signal read out with a second degree of gain; and
  e. a selection circuit arranged to select said first signal line when the mode of said storing action control circuit is either in said first mode or said second mode and said second signal line when said control circuit is in said third mode.

10. A device according to claim 9, further comprising first and second light receiving parts, wherein a signal indicative of the cumulatively stored photo signal corresponding to light incident on said first light receiving part is compared by said first and second comparison means, and wherein a photo signal cumulatively stored according to light incident on said second light receiving part is read out by said reading circuit.

11. A photo signal sensor device for storing a signal value corresponding to the quantity of incident light, comprising:
  a. monitor means for monitoring said signal value stored by said sensor device;
  b. a comparison circuit arranged to compare a signal value obtained from said monitor means with a first value representing a first received light quantity, to produce a first output if said signal value exceeds said first value, to compare said signal value with a second value representing a second received light quantity which is larger than said first received light quantity and to produce a second output if said signal value exceeds said second value;
  c. a storing time control circuit having a first mode in which said control circuit terminates the signal value storing action of the device in response to said second output when said comparison circuit generates said second output within a period of time after commencement of said signal value storing action, a second mode in which said storing action is terminated in response to the second output of said comparison circuit when said stored signal value is between said first and second received light quantity values after the lapse of said given period of time from the start of said storing action and a third mode in which said storing action is terminated in response to said first output when said first output is not produced from said comparison circuit within a given period of time after the start of said storing action;

d. a reading circuit arranged to read out said signal value stored after termination of the storing action of said sensor device; and e. a gain control circuit arranged to cause said reading circuit to perform signal reading with a first degree of gain when said storing time control circuit is either in said first mode or in said second mode and with a second degree of gain which differs from said first degree of gain when said storing time control circuit is in said third mode.

12. A device according to claim 11, further comprising first and second light receiving parts, wherein said reading circuit is arranged to red out a stored signal value corresponding to quantity of light received by said first light receiving part, and wherein a signal representing a stored signal value corresponding to quantity of light received by said second light receiving part is supplied to said monitor means.

13. A photo signal sensor device for storing a signal value corresponding to the quantity of incident light, comprising:

a. monitor means for monitoring said signal value stored by said sensor device;

b. a comparison circuit arranged to compare a signal value obtained from said monitor means with a first value representing a first received light quantity, to produce a first output if said signal value exceeds said first value, to compare said signal value with a second value representing a second received light quantity which is larger than said first received light quantity and to produce a second output if said signal value exceeds said second value;

c. a storing time control circuit having a first mode in which said control circuit terminates the signal value storing action of said device when said comparison circuit generates said second output if said signal value stored reaches a given value within a given period of time after commencement of said signal value storing action and a second mode in which said storing action is terminated when said comparison circuit generates said first output if said signal value stored fails to reach said given value within said given period of time;

d. a reading circuit arranged to read out said signal value stored after termination of the storing action of said sensor device; and e. a gain control circuit arranged to change the degree of gain with which said reading circuit performs signal reading from one degree over to another according to the first mode or the second mode of said storing time control circuit.

14. A device according to claim 13, further comprising first and second light receiving parts, wherein said reading circuit is arranged to read out a stored signal value corresponding to quantity of light received by said first light receiving part, and wherein a signal representing a stored signal value corresponding to quantity of light received by said second light receiving part is supplied to said monitor means.

* * * * *

UNITED STATES PATENT AND TRADEMARK OFFICE
CERTIFICATE OF CORRECTION

PATENT NO. : 4,870,266

DATED : September 26, 1989

INVENTOR(S) : Akira Ishizaki; Yoshio Nakamura; Shigetoshi Sugawa

It is certified that error appears in the above-identified patent and that said Letters Patent is hereby corrected as shown below:

```
Col. 1, line 7.    Change "on device" to -- on a device --
Col. 1, line 58.   Change "employed" to -- found --
Col. 2, line 3.    Change " lever" to -- level --
Col. 4, line 33.   Change "an" to -- and --
Col. 5, line 36.   Delete ","
Col. 6, line 45.   Change "TB1 to -- Tbl --
Col. 9, line 64.   Change "(INTCNT 0)" to -- (INTCNT <- 0)--
Col. 10, line 12.  Change "->" to -- <- --
Col. 10, line 18.  Delete "=" first occurrence
Col. 10, line 34.  Change "<" to -- > --
Col. 10, line 51.  Change "->" to -- <- --
Col. 11, line 12.  Change "->" to -- <- --
Col. 15, line 13.  Change "red" to -- read --
```

Signed and Sealed this

Twenty-eighth Day of August, 1990

*Attest:*

HARRY F. MANBECK, JR.

*Attesting Officer*   *Commissioner of Patents and Trademarks*